United States Patent [19]

Sipes, Jr.

[11] Patent Number: 4,710,940
[45] Date of Patent: Dec. 1, 1987

[54] METHOD AND APPARATUS FOR EFFICIENT OPERATION OF OPTICALLY PUMPED LASER

[75] Inventor: Donald L. Sipes, Jr., Los Angeles, Calif.

[73] Assignee: California Institute of Technology, Pasadena, Calif.

[21] Appl. No.: 782,711

[22] Filed: Oct. 1, 1985

[51] Int. Cl.⁴ .......................................... H01S 3/093
[52] U.S. Cl. .................................... 372/75; 372/69
[58] Field of Search ............................ 372/69, 70, 75

[56] References Cited

U.S. PATENT DOCUMENTS

| | | | |
|---|---|---|---|
| 3,414,839 | 12/1968 | Bridges et al. | 331/94.5 |
| 3,530,388 | 9/1970 | Guerra et al. | 330/4.3 |
| 3,566,128 | 2/1971 | Arnaud | 250/199 |
| 3,614,659 | 10/1971 | Rigrod | 331/94.5 |
| 3,735,280 | 5/1973 | Johnston | 372/75 |
| 3,753,145 | 8/1973 | Chesler | 331/94.5 |
| 3,886,480 | 5/1975 | Vali et al. | 331/94.5 |
| 3,982,201 | 9/1976 | Rosenkrantz et al. | 331/94.5 |
| 4,035,742 | 7/1977 | Schiffner | 331/94.5 |
| 4,357,704 | 11/1982 | Koechner | 372/72 |

OTHER PUBLICATIONS

R. B. Chesler, et al., Appl. Phys. Lett., vol. 23, No. 5, Sep. 1, 1973, pp. 235–236.
M. Saruwateri, et al., Appl. Phys. Lett., vol. 29, No. 5, Sep. 1, 1976, pp. 291–293.
K. Washio, et al., Appl. Phys. Lett., vol. 29, No. 11, Dec. 1, 1976, pp. 720–722.

*Primary Examiner*—Gene Wan
*Attorney, Agent, or Firm*—Freilich, Hornbaker, Rosen & Fernandez

[57] ABSTRACT

An optically pumped single mode laser, e.g., Nd:YAG crystal (20) with planoconcave mirrors is increased in efficiency by an order of magnitude to about 8% by focusing the high power multimode output of laser diode arrays (21, 22) into the mode volume (20') of the laser medium (20). A plurality of these optically pumped single mode lasers (1–4) may be cascaded in a ring with dichroic mirrors ($M_1$–$M_4$) at the corners for coupling in the laser diode arrays, each having its own means for spatially tailoring its beam to concentrate pump distribution inside the lasing mode volume of the medium. An InGaAlAs pump diode (30) with its wavelength the same as the lasing medium makes the ring unidirectional.

9 Claims, 11 Drawing Figures

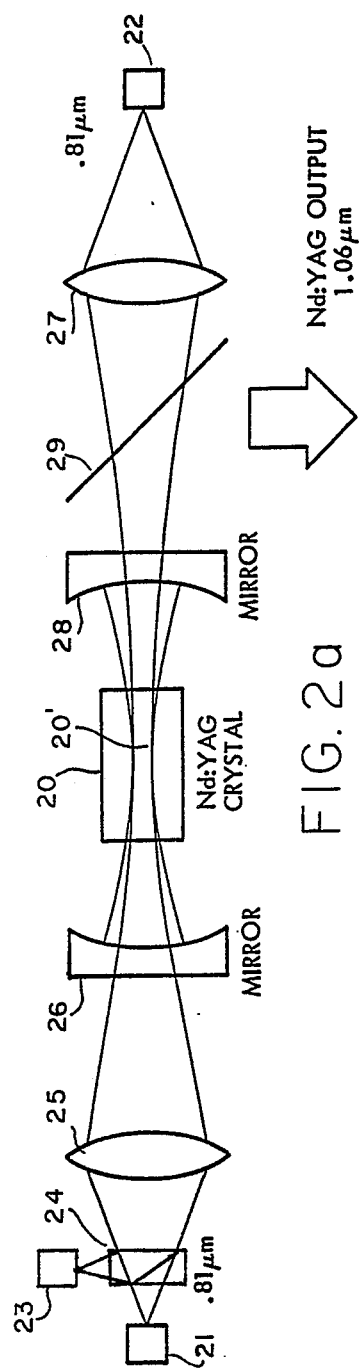
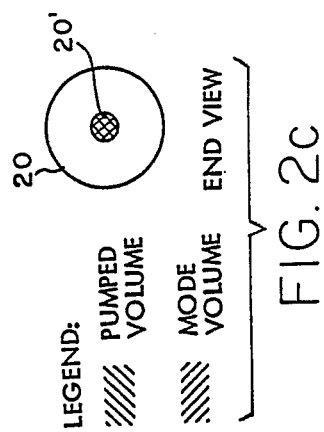
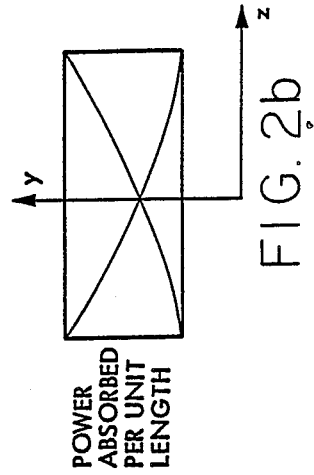

METHOD AND APPARATUS FOR EFFICIENT OPERATION OF OPTICALLY PUMPED LASER

ORIGIN OF INVENTION

The invention described herein was made in the performance of work under a NASA contract, and is subject to the provisions of Public Law 96-517 (35 USC 202) in which the Contractor has elected to retain title.

BACKGROUND OF THE INVENTION

This invention relates to optically pumped lasers, and more particularly to such lasers as laser diode pumped Nd:YAG lasers.

Many applications require an efficient reliable laser source having a high peak to average power capability, and capable of emitting a stable radiation pattern. Optical communication over the deep space is such an application. Nd:YAG lasers pumped by semiconductor laser diodes have figured prominently among potential sources for such applications. In this arrangement many GaAlAs/GaAs laser diodes can be combined to optically pump the Nd:YAG laser. Recent work reported by the inventor in Appl, Phys, Lett. 47(2), July 15, 1985, pp 74-76, has indicated that by utilizing the proper pump geometry, nearly half of the output of the GaAlAs/GaAs diode laser can be converted to Nd:YAG laser light.

The Nd:YAG laser can be thought of as a means for converting incoherent light from laser diodes to coherent light. In that manner, many laser diodes with poor spatial and spectral qualities may be converted into a single coherent source with vastly improved spatial and spectral properties. Thus, as compared to simply combining incoherent laser diode sources, a powerful, extremely bright, coherent laser source can be realized with such a converter while sacrificing little in size or efficiency. Moreover, the increased power allow the system designer of a deep space communication system the added freedom to trade for increased data rate or decreased aperture or pointing requirements, thus reducing size mass and complexity of the communications system.

In prior-art devices, the geometry conventionally used to accomplish this conversion of incoherent light from laser diodes into a coherent light is the side-pumped geometry in which the diodes are placed along the length of the laser medium, such as a crystal rod (e.g., Nd:YAG) or liquid column (e.g., dye laser). The medium is thus pumped perpendicular to the direction of propagation of the laser resonator mode. As more power is required, more diodes can be added along and around the laser medium. However, this prior-art arrangement is relatively inefficient, and thus requires large numbers of pump diodes to achieve a respectable output power level.

SUMMARY OF THE INVENTION

In accordance with the present invention, a laser medium is end pumped by an array of laser diodes through means for focusing the output of the laser diodes into the small cross section of the resonator mode volume of the laser medium in order to produce $TEM_{oo}$ mode lasing. Thus, by spatial tailoring of the pump distribution for mode control, i.e., for sufficient concentration inside the lasing mode volume of the medium along the axis of propagation, the laser operates in a single transverse lasing mode, a property desired to make the pumped laser useful.

In one embodiment, the output of a laser diode array is focused into the small cross section of the resonator mode volume of the laser medium. The resonator cavity mirrors are planoconcave with one having the concave mirror surface coated for high reflection at the wavelength of the lasing medium, which is distinct from the wavelength of the laser diode array, and at the other having the concave mirror surface coated with a reflecting material that will reflect about 95% of the light at the wavelength of the lasing medium and transmit as a coherent output the balance. All of the light at the wavelength of the laser diode array is preferably reflected by these concave mirror surfaces. In a variation of this embodiment, a second laser diode array with its own spatial tailoring means is end coupled by suitable means into the laser medium, such as by a dichroic mirror or a polarizing beam-splitting cube. The variation lends itself very well to end pumping a plurality of lasing mediums and means for coupling each lasing medium in the ring to the next. At each corner of the ring, a pair of laser diode arrays are coupled to end pump each adjacent lasing medium with its own spatial tailoring means. The output of an injection locking diode is coupled with the output of a laser diode array by suitable means to provide unidirectional operation of the ring.

BRIEF DESCRIPTION OF THE DRAWINGS

FIG. 2a illustrates schematically the end pumping geometry of the present invention.

FIG. 2b is a graph of power absorbed per unit length of the end pumped lasing medium of FIG. 2a.

FIG. 2c is an end view illustrating the mode matching properties of the geometry of FIG. 2a.

DESCRIPTION OF PREFERRED EMBODIMENTS

Figure 1A:
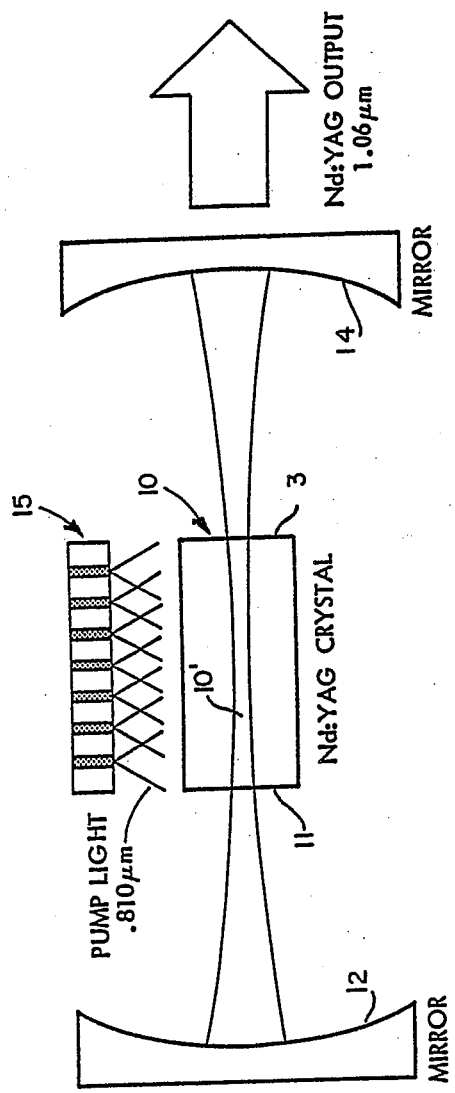
FIG. 1a illustrates schematically the side pumping geometry of the prior art.

Referring to the drawings, FIG. 1a illustrates a laser medium 10 (such as an Nd:YAG crystal) with conventional side-pumping geometry. In this configuration, the incoherent diodes 15 (AlCaAs/GaAs, $\lambda=0.81$ $\mu$m) are placed along the length of the laser medium and pumped perpendicularly to the direction of propagation of the laser resonator mode volume 10'. As more power is required, more laser diodes can be added along and around the laser rod. The result is a incoherent-to-coherent lasing converter which is only about 0.5% efficient. That is much too low for a deep-space optical transmitter which requires about 5% to 10% efficiency.

The large inefficiencies of the side-pumped geometry for a crystal or liquid laser result from a small absorption length (usually ~3 mm), relatively large pumped volume (so the pumping density is low), and the small cross section of the resonator mode volume 10'. There are pumped regions of the total volume where energy is wasted because of this mode mismatch.

Figure 1B:
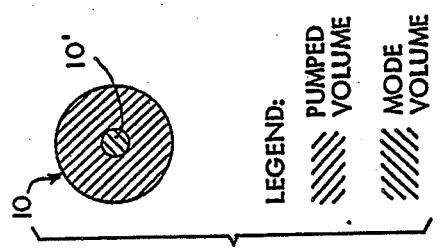
FIG. 1b is an end view of the lasing medium showing the small cross section of the resonator mode of the lasing medium.

The resonator configuration is planoconcave with one end 11 having a mirror 12 coated for high reflection at the lasing wavelength ($\lambda d = 1.06$ μm for Nd:YAG) and the other end 13 having a mirror 14 coated for about 95% reflection at that wavelength; the balance is transmitted as an output beam. FIG. 1b shows in an end view of the lasing medium 10 the total volume pumped by an array of the laser diodes 15, and the lasing mode volume 10'. It can be readily appreciated that only a very small fraction of the pump light is directed into the mode volume.

In one example of the present invention illustrated in FIG. 2a, nearly half the light from a CaAlAs/GaAs laser diode array is converted to Nd:YAG laser radiation using a tightly focused end-pumping configuration. In this configuration the Nd:YAG medium 20 acts as an efficient incoherent-to-coherent converter of the laser diode light pumped through both ends from laser diodes or diode arrays. Experimentally 80 mW CW power in a single mode was achieved with a single semiconductor laser array pump. This corresponds to an overall efficiency of 8.0%. With two laser diode arrays 21, 22 pumping, one at each end, even greater power may be achieved out of the Nd:YAG laser. It is even possible to couple yet another laser diode array 23 such as by a polarizing beam splitting cube 24 which reflects light from the diode array 23, and transmits light from the diode array 21 to laser optics which includes a focusing lens 25 and planoconcave mirror 26. The laser diode array 22 at the other end has its focusing lens 27 and planoconcave mirror 28. It also has means for separating the laser diode wavelength from the Nd:YAG wavelength to provide an Nd:YAG output, such as a dichroic mirror 29 that reflects 1.06 μm and transmits 0.81 μm wavelengths.

In this end-pumping geometry shown in FIG. 2a, the pump light is collected and focused to a small spot (typically 50 to 100 μm) that matches the ends of the resonator mode volume 20'. It is immediately apparent that this geometry rectifies virtually all the inefficiencies that plague the side-pumped scheme. First, the absorption length can be made as long as necessary to absorb practically all of the pump light, as illustrated in FIG. 2b. Second, the pump light can be focused to provide the intensities needed for efficient lasing. Finally, the laser diode beams can be adjusted to completely fill the lasing mode volume as illustrated in FIG. 2c, and thus avoid loss of light in the lasing medium outside of the lasing mode volume. This is particularly useful with high power laser diode arrays which inherently produce a beam with more than a single lobe, such as two lobes. The focusing system can direct both lobes into the lasing mode volume.

End pumping was the subject of considerable interest in the mid-1970s for use as transmitters in optical fiber communications. R. B. Chesler and D. A. Drawgert, "Miniature diode-pumped Nd:YAIG lasers," Appl. Phys. Lett. 23, 235 (1973); M. Saruwateri, T. Kumura, and K. Otuka, "Miniaturized CW LiNdP$_4$O$^{12}$ laser pumped with semiconductor laser," Appl. Phys. Lett. 29, 291 (1976); and K. Washia, K. Iwanto, K. Inoue, I. Hino, S. Natsumato and S. Saito, "Room-temperature cw operation of an efficient miniaturized Nd:YAG laser end-pumped by a superluminescent diode," Appl. Phys. Lett. 29, 720 (1976). Such arrangements using low power, single mode laser diodes were primarily for achieving a low lasing threshold, and were not concerned with high power and high efficiency operation. Laser diodes of sufficient output power have been available only recently to fully exploit this highly efficient regime of operation. However, high power laser diodes are multimode because they are comprised of an array of diodes in a chip which tend to operate multimode unless operation of the array is tailored, such as by gain tailoring the array. Such gain tailored diode arrays are generally of less power output and furthermore are not yet commercially available with high power output.

To accurately estimate the overall efficiency of an end-pumped lasing medium, all factors that give rise to energy loss must be identified. First, there is the quantum efficiency, $\eta_q$, which is the ratio of the lasing photon energy to the pumping photon energy. The quantum efficiency represents the maximum theoretical limit for laser efficiency. Next, $\eta_o m$ the operating efficiency, includes the resonator losses and conversion efficiency of pump photons into lasing photons. The mode-matching efficiency, $\eta_m$, is the fraction of the pumped cross-section area that lies within the oscillating mode volume. The fraction of light incident at the laser rod end that is absorbed in the gain medium (assuming all of the laser diode light falls within the pump absorption bands) is designated $\eta_{abs}$, while $\eta_i$ and $\eta_c$ describe the interface and pump light coupling efficiencies, respectively. Finally, $\eta_{LD}$ is the electrical-to-optical laser-diode efficiency. These factors are separately discussed in greater detail.

OPERATION EFFICIENCY ($\eta_o$)

The efficiency with which pump photons are converted to lasing photons can be calculated as a function of input pump power, cavity loss, and beam radius. We start with the steady-state rate equations describing the spatial evolution of the inversion and photon energy densities:

$$\frac{dS^+}{dz} = [\beta N - \alpha] S^+ \quad (1a)$$

$$\frac{dS^-}{dz} = [\beta N - \alpha] S^- \quad (1b)$$

$$0 = R_p - \frac{N}{\tau_s} - \nu\beta N [S^+ + S^-] \quad (2)$$

where $S^+$ and $S^-$ are the forward and backward propagating photon energy densities respectively (J/cm$^3$), N is the inversion energy density (J/cm$^3$), $\alpha$ is the loss coefficient per unit length of material (cm$^{-1}$), $\beta$ is the stimulated emission coefficient ($\beta = \sigma/h\nu_1$ where $\sigma$ is the stimulated emission cross section (cm$^2$)), $\tau_s$ is the spontaneous emission lifetime (s), $\nu$ is the group velocity of the wave in the medium, and $R_p$ is the pumping power density (W/cm$^3$). Any radial dependence is included in the mode matching efficiency $\eta_m$ and so is neglected here.

Figure 3:
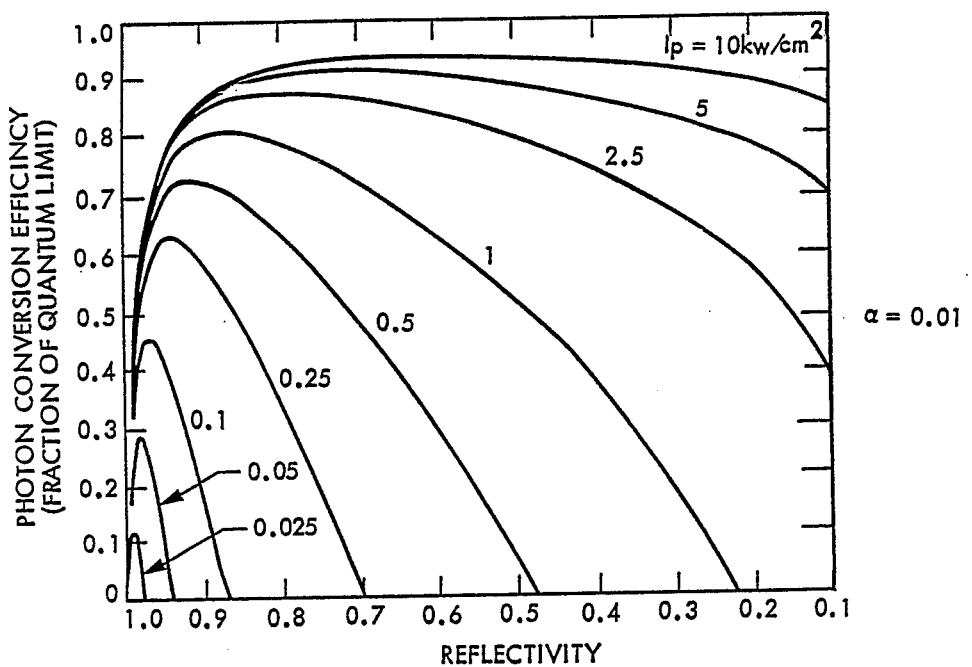
FIG. 3 is a plot of calculated values of semiconductor-laser-pumped Nd:YAG efficiency as a function of mirror reflectivity for several values of input pump intensity (for the case or perfect mode matching).
Figure 4:
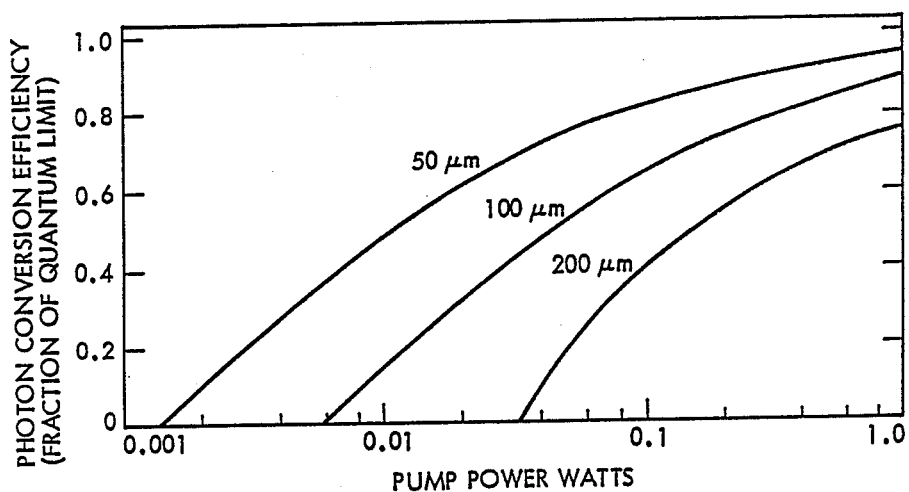
FIG. 4 is a plot of calculated Nd:YAG efficiency as a function of input pump power for several values of minimum pump beam radii.

These equations can be solved numerically to find the output power efficiency as a function of the mirror reflectivity for various input power intensities. FIG. 3 illustrates that for an input intensity of 10 kW/cm$^2$, the photon-to-photon conversion efficiency exceeds 90% (where a single pass loss of 1% and $\sigma = 7.6 \times 10^{-9}$ cm$^2$ given by M. Birnbam, A. Tucker and C. Fincher, "Laser Emission Cross Section of Nd:YAG at 1064 μm," J. Appl. Phys. 52 Mar. 1981, pp 1212–1214 were assumed). FIG. 3 shows efficiency as a function of output mirror reflectivity for various input power intensities, and FIG. 4 relates efficiency to input power for various modal radii.

MODE MATCHING EFFICIENCY ($\eta_m$)

For the efficient use of pump light for stimulated emission, the pump light must fall within the Gaussian mode of the resonator and not be wasted as spontaneous emission. Because the pump beam cross section may be elliptical and not circular, and because the gain along the laser rod is nonuniform, laser efficiency varies with pump and laser mode parameters in a complex way. In D. C. Hall, R. J. Smith and R. R. Rice, "Pump Size Effects in Nd:YAG Lasers," Appl. Opt., 19, 1980, pp 3041–3043, it was shown that efficiency is maximized for the matched mode case: i.e., $R_o \cong W_o$, where $R_o$ and $W_o$ are the pump- and laser-mode Gaussian beam waist radii, respectively. Although their analysis did not take into account high-gain operation, nonuniform gain distribution, or the divergent nature of Gaussian beams, $R_o \cong W_o$ is still a good design starting point. Further analysis and experimentation are being conducted to determine exact conditions for optimum performance.

ABSORPTION EFFICIENCY ($\eta_{abs}$)

Figure 5:
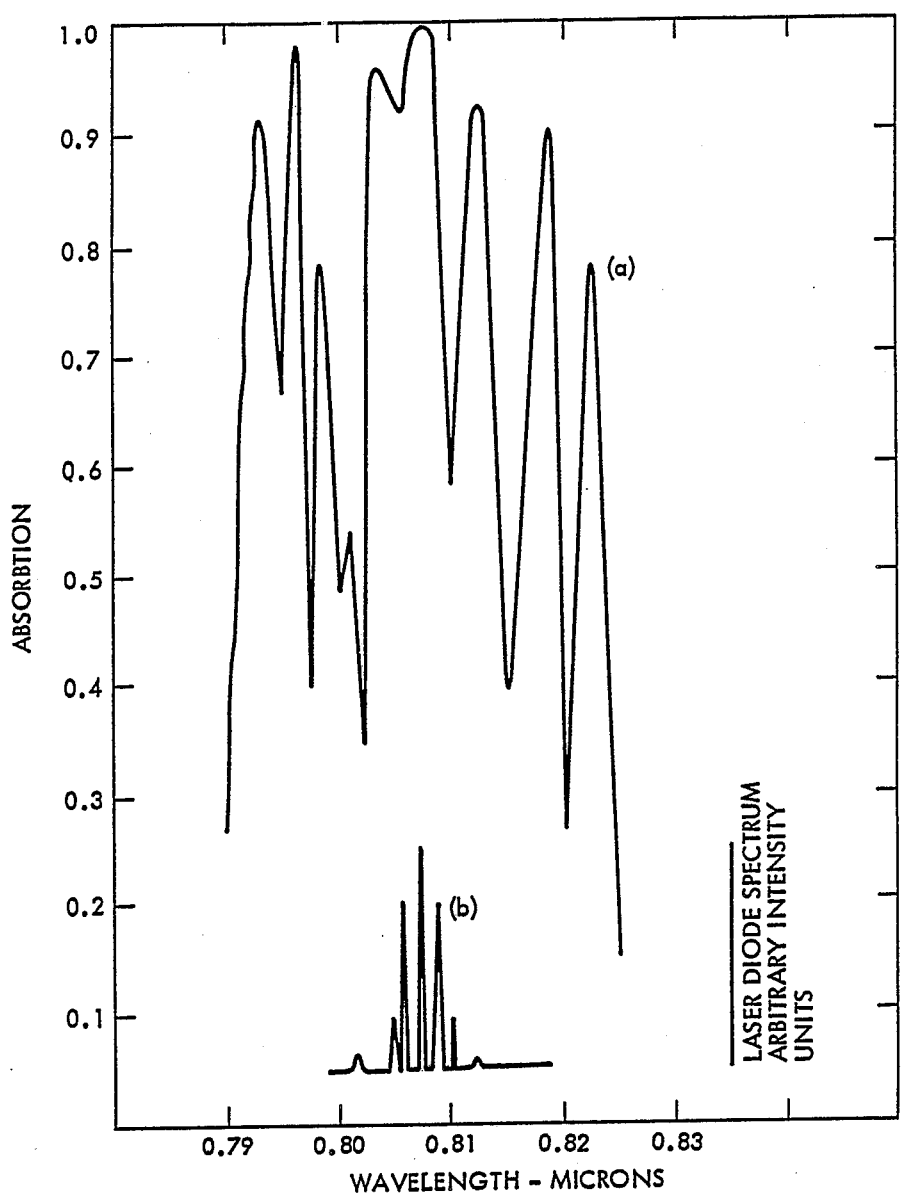
FIG. 5 illustrates the spectral properties of diode-pumped Nd:YAG laser; graph (a) is for the 0.81 $\mu$m absorption band in a 1-cm sample of 1% Nd:YAG; graph (b) is for the emission spectrum of a semiconductor laser pump array.

FIG. 5 shows the absorption spectrum of a 1-cm sample of 1% Nd$^{+3}$ in YAG and the corresponding emission spectrum of the laser diode pump source. It can be seen from this figure that the laser diode source spectrum falls well within the main Nd:YAG pump band centered at 807 nm. As illustrated, the Nd:YAG absorption spectrum is fine structured, so experimentation is needed to determine how precisely the laser diode spectrum needs to be controlled. From FIG. 5 one can calculate the length of the YAG rod needed to absorb virtually all of the pump light. For example, a 1-2-cm-long crystal will absorb over 90% of the incident pump light.

INTERFACE EFFICIENCY ($\eta_i$)

To achieve sufficient feedback, the gain medium in a laser must be placed between two mirrors of high reflectivity. The high-reflectivity is usually obtained by coating the mirrors with a multilayer dielectric coating. Since the pump light must pass through this coating (or interface) to pump the medium, it is important that the coating be highly reflective at the lasing wavelength yet highly transmissive at the pump wavelength. By using properly designed dielectric coatings, one can produce a mirror that reflects 99.8% of the light at 1.06 μm, yet transmits over 95% of the pump light at 0.810 μm.

COUPLING EFFICIENCY ($\eta_c$)

Figure 6:
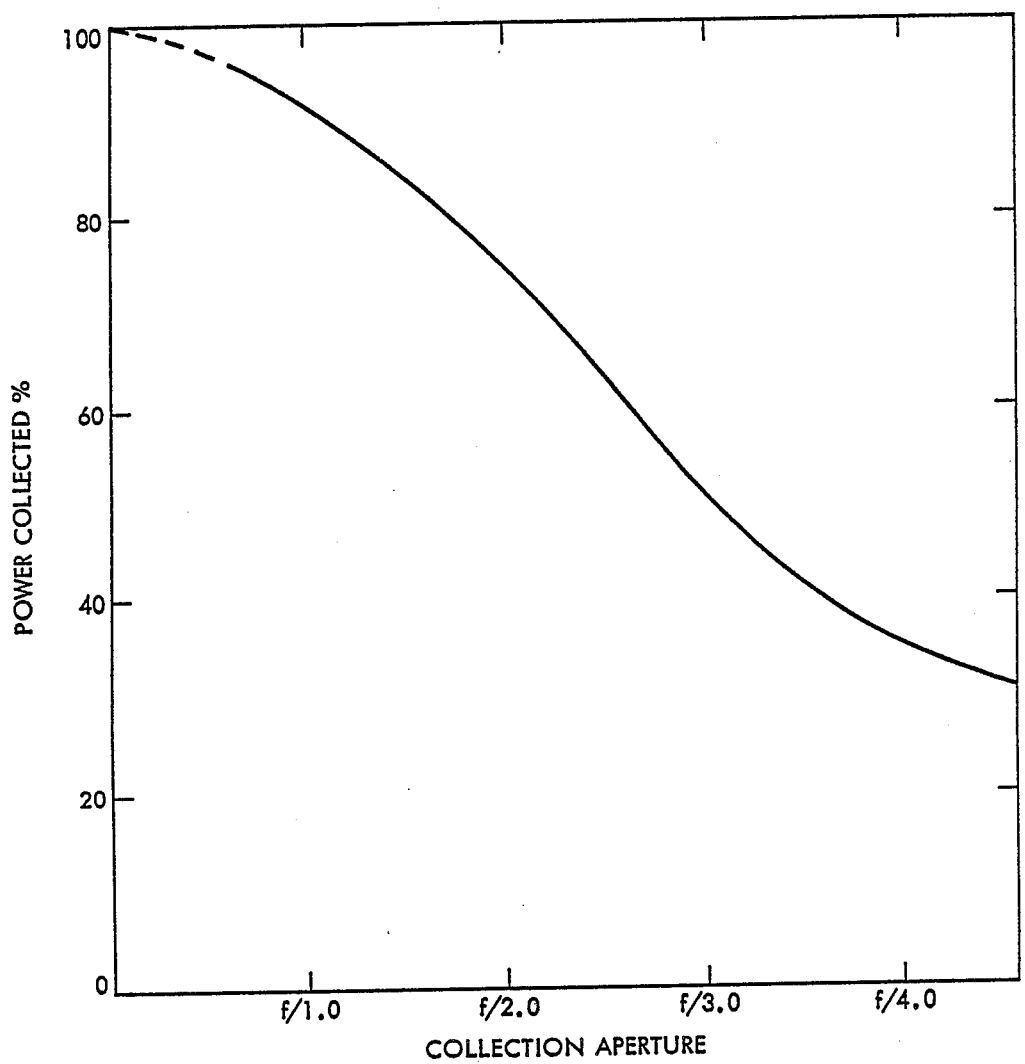
FIG. 6 is a plot of power collection efficiency for standard laser diodes.

For the device to operate efficiently, pump light must be collected and focused onto the gain medium efficiently. The focusing system must be small, have a short working distance, and have a minimum number of optical components to ensure high throughput and less sensitivity to motion (displacements). FIG. 6 shows how collection efficiency varies with the f number of the collecting lens for standard laser diodes. Systems with over 90% efficiency (collection and transmission) are available commercially.

TOTAL OPTICAL CONVERSION EFFICIENCY

The total optical conversion efficiency can now be calculated by simply taking the product of all the subsystem efficiencies previously mentioned:
 quantum efficiency: $\eta_c = 76.7\%$
 operation efficiency: $\eta_o \gtrsim 90\%$
 mode matching efficiency: $\eta_m \approx 100\%$
 absorption efficiency: $\eta_{abs} \gtrsim 90\%$
 interface efficiency: $\eta_i \gtrsim 95\%$
 collection efficiency: $\eta_c \gtrsim 90\%$
 $\therefore \eta_{opt} = \eta_q \eta_o \eta_m \eta_{abs} \eta_i \eta_c \geq 50\%$ The laser is therefore expected to convert over half of the pump power into laser light at the Nd:YAG fundamental wavelength.

OVERALL ELECTRICAL EFFICIENCY

The total overall electrical-to-optical efficiency is just the optical efficiency $\eta_{opt}$ times the power efficiency of the laser diode pump source, $\eta_{LD}$. For commercially available diode lasers, $\eta_{LD}$ is 10% or more, so overall efficiencies of up to and greater than about 5% can be expected. This value is over 10 times better than the efficiency of previous side-pumped lasers. It is also to be noted that laser diode efficiency becomes the limiting factor for highly efficient operation.

RESONATOR PARAMETERS

To achieve the small spot sizes necessary for efficient operation, the dimensions of a simple (i.e., 2-mirror) and stable resonator must be small. For example, the confocal resonator, the most stable, requires mirrors with radii or curvature of 5 cm and a separation of 5 cm to achieve beam waist radii of approximately 50 μm. This isadvantageous in that it reduces the overall size of the optical transceiver package—a prime consideration in space optical communications systems development.

FOCUSING SUBSYSTEM

The focusing subsystem needs to have an f number smaller than 1 to efficiently collect and deliver the pump light (see FIG. 6). Since only on-axis performance is required, commercially available aspheric lenses with f numbers as low as 0.6 can be used for this purpose. A working distance (i.e., the distance from the optics to the focal plane) of 1 to 2 cm is required. For a given working distance, there is a minimum diameter that the incident beam possesses in order to be focused to the desired size. For Gaussian beams, the minimum focused spot size is given by:

$$2W_o = \frac{1.27 \lambda f}{d} \quad (3)$$

where $W_o$ is the radius of the focused spot, d is the diameter of the incident beam, f is the focal length of the lens, and λ is the wavelength. Hence, for $W_o = 50$ μm and f = 2 cm, d equals 0.02 cm. What this shows is that extremely small optics can be used to collect and deliver the pump light, thus keeping the overall size and weight of the laser small.

It is not altogether clear whether or not the pump beam needs to be anamorphically transformed from its elliptical shape at the laser diode source to the circular beam of the resonator mode. The analysis of D. G. Hall, "Optimum Mode Size Criterion for Low Gain Lasers," Appl. Optics, 20, May 1 1981, pp 1579–1583, seems to indicate that pump profile shape does not matter much as long as all of the pump light falls within the resonator mode. There is a problem with applying this analysis because it does not take into account the divergent nature of Gaussian beams. However, if experience shows that it is advantageous to manipulate the cross section of the pumping beam, it would be a matter of simply the addition of a cylindrical lens.

PUMPING CONFIGURATIONS

In all the analyses presented thus far, the problem of concentrating the diode pump power to produce sufficient laser output power has been neglected. The area into which the laser diodes themselves must be packed to ensure proper mode matching over the length of the rod is governed by conservation of brightness: $A_1 \Omega_1 = A_2 \Omega_2$, where $A_1$ and $A_2$ are the object and image source areas respectively, and $\Omega_1$ and $\Omega_2$ are the divergent and convergent solid angles respectively. Since the diode pump source is anamorphic, the packing requirements for directions perpendicular to the junction are different than those for directions parallel to the junction. The relationship between pump beam and laser-mode size is quite complicated, but estimates based on convertion of brightness seem to indicate that pump diodes must be placed within 100 $\mu$m for efficient operation. An alternative to simple stacking, which has been used in pumping very short $Nd^{+3}$ lasers, is fiberoptical pump coupling. In this scheme, the pump light is transmitted from the diodes to the gain medium through multimode fibers. Such fiber couplers have been built with only 1.5-dB insertion loss. It would be preferable to increase the Nd:YAG power output by a unidirectional ring arrangement of a plurality of end-pumped lasers, each as shown in FIG. 2a.

Figure 7:
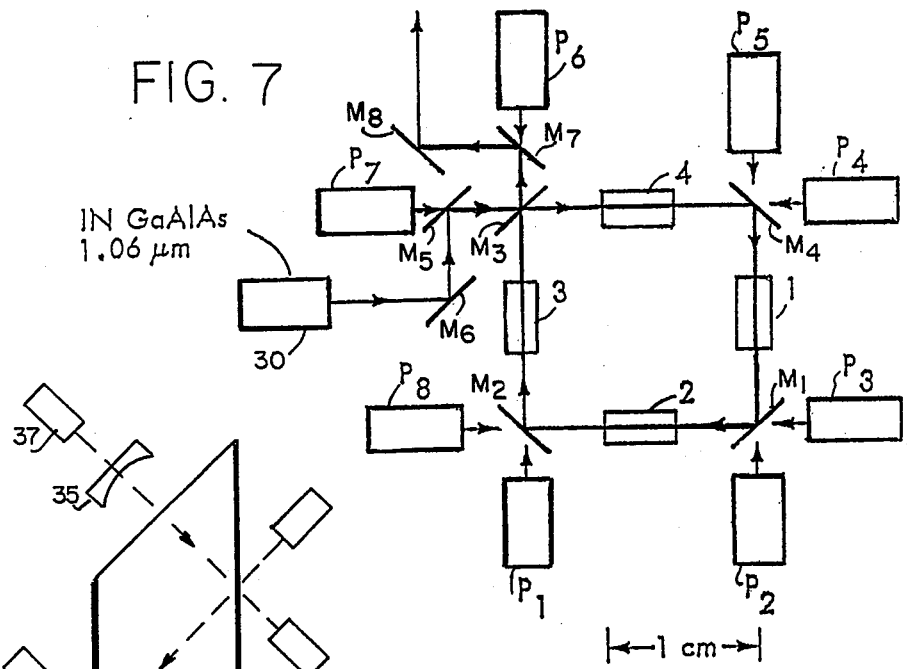
FIG. 7 is a schematic diagram of a unidirectional ring laser comprised of four end pumped lasers pumped by eight laser diode sources.

Since the single pass gain of the laser is the integral of the gain per unit length, several Nd:YAG lasers can be cascaded together so that the packing requirement goes down by a factor or 1/N compared to a simple double-ended pump (N is the number of lasers, assuming each laser can be pumped from both ends, cascaded together). This novel concept is illustrated in FIG. 7. A traveling wave laser consisting of four Nd:YAG lasers 1–4 pumped by eight laser diode sources $P_1$–$P_8$ of 200 mW each, which together produce 1.6 W of pump power, and 800 mW of output power at 1.06 $\mu$m. Unidirectional power flow in this ring cavity can be insured in several ways; for example by an InGaAlAsP laser operating at 1.06 $\mu$m acting as an injection locking device. The scale in FIG. 7 is drawn to show that it is possible to achieve high output powers in very small packages for free-space optical communications.

Each pair of laser diode pump sources (each with its focusing optics) at a corner of the laser ring is coupled into the ring by a dichroic mirror $M_1$–$M_4$ that reflects the wavelength of the Nd:YAG lasing mediums 1–4 at 1.06 $\mu$m. A similar mirror $M_5$ is used to couple the locking diode laser beam at 1.06 $\mu$m into the ring to give it unidirectionality. A mirror $M_6$ used just for the purpose of positioning the laser diode source 30 may be a plain mirror. Similarly, a dichroic mirror $M_7$ is used to couple the output beam at 1.06 $\mu$m, and a plain mirror $M_8$ is used simply to direct the output beam in a desired direction with respect to the total system that will measure about 4.5×4.5 cm, including packaging. Such a small size and high power output will lend the system to efficient use in space communications.

Figure 8:
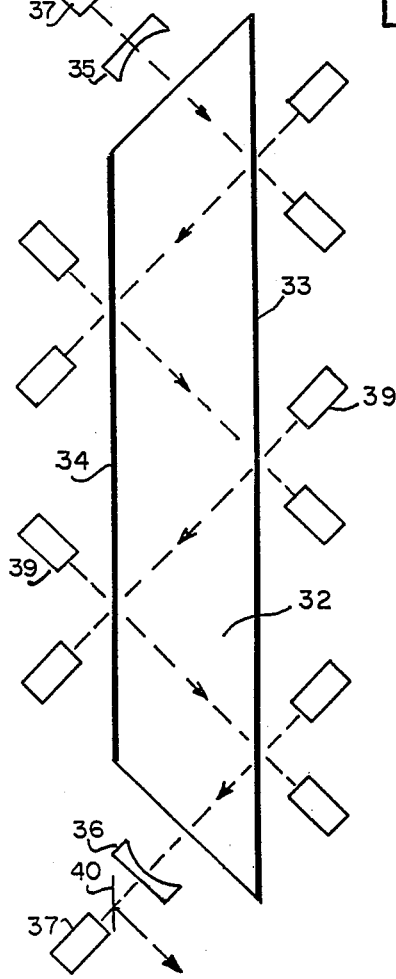
FIG. 8 is a schematic diagram of a variant of FIG. 7.

Although a highly efficient $TEM_{oo}$ Nd:YAG laser end-pumped by GaAlAs/GaAs laser diodes has been disclosed as an example, it is recognized that the concept of the invention may be applied to lasing mediums other than Nd:YAG, such as Nd:GGG, Nd:YLF, or even a liquid as used for dye lasers. The concept may also be extended to other analogous arrangements, such as disclosed in FIG. 8 wherein a medium 32, such as Nd:YAG crystal, is provided with dichroic mirrors 33, 34 on opposite sides and planoconcave mirrors 35 and 36 through which the medium is pumped. Each beam path in the medium constitutes a pump volume as though contained in separate crystals arranged in a zig-zag pattern. Laser diode arrays 37 with focusing optics pump from the ends, while similar laser diode arrays 39 with focusing optics pump at the corners of the lasing beam path in the medium. An advantage of such an arrangement over the ring arrangement of FIG. 7 is that it will not require an injection laser. The reflectivity miorror 36 is optimized for maximum power output for a given pump power input as in the single mode volume of FIG. 2a. An output beam is reflected by a dichroic mirror 40. Consequently, it is intended that the claims be interpreted to cover such modifications and equivalents.

What is claimed is:

1. An optically pumped laser comprising an optical resonator cavity, a laser medium in said resonator cavity, said laser medium having an optical axis and two ends, one end at each of two opposite sides of said medium intersected by said optical axis, an array of laser diodes positioned for pumping said laser medium in the direction of the axis of said resonator cavity, and means for causing the pump distribution from said array of laser diodes to be concentrated inside the lasing mode volume of said medium.

2. An optically pumped laser as defined in claim 1 wherein an array of laser diodes and said means for concentration is provided at both ends of said medium, and including a mirror for separating the output of said medium as an output beam from the pump distribution at one end of said medium.

3. An optically pumped laser as defined in claim 2 including a second array of laser diodes at one end of said medium, and means for combining at said one end the output of the second array of laser diodes with the output of the first array of laser diodes for a combined pumping beam into said lasing mode volume through separate means for each array of laser diodes for concentration of the pump distribution form each of said array of laser diodes inside the lasing mode volume of said medium.

4. An optically pumped laser as defined in claim 2 including a plurality of cascaded laser mediums arranged with separate mirrors to form a closed optical polygon for each laser medium, each laser medium having at least one laser diode array and means for concentration of pump distribution of light from the laser diode array into the lasing mode volume of the laser medium through one of said separate mirrors coupling said laser mediums in said polygon, an injection locking laser diode operating at the wavelength of said medium, and means for combining the output of said injection locking laser diode with the output of one array of laser diodes for pumping one of said mediums in a predetermined direction around said closed optical polygon, and means for extracting from said closed optical polygon output laser beam emanating from one medium in said predetermined direction.

5. An optically pumped laser as defined in claim 2 including a plurality of cascaded laser mode volumes arranged in a zig-zag pattern with the optical axis of adjacent optical mode volumes intersecting at a corner of said zig-zag pattern, a mirror at each corner, each mode volume having at each end a laser diode array and means for concentration of light from said laser diode array into the mode volume for pumping and means at one end of said zig-zag pattern for extracting an output laser beam emanating from one laser mode volume.

6. An optically pumped single mode laser comprising an optical resonator cavity, a laser medium in said resonator cavity, said laser medium having an optical axis and two ends, one end at each of two opposite sides of said laser medium intersected by said optical axis, an array of multimode laser diodes positioned for pumping said laser medium in the direction of the axis of said resonator cavity, and means for concentration of the pump distribution from said multimode laser diodes inside the lasing mode volume of said laser medium.

7. An optically pumped singlemode laser as defined in claim 6 wherein an array of multimode laser diode and concentration means is provided at both ends of said laser medium, and including a mirror at one end of said laser medium for separating the singlemode output of said laser medium as an output beam.

8. An optically pumped singlemode laser as defined in claim 7 including a second array of multimode laser diodes at one end of said medium, and means for combining the output of said second array with the output of said first array of multimode laser diodes at said one end for a combined pumping beam directed into said means for concentration of the pump distribution from said laser diodes.

9. An optically pumped singlemode laser as defined in claim 6 including a plurality of cascaded single-mode laser mediums arranged in a closed optical polygon with a separate mirror between each pair of cascaded laser mediums, each medium having at each end a multimode laser diode array and concentration means for pumping through said separate mirrors between cascaded laser mediums into the mode volume of said laser medium between said separate mirrors, an injection locking laser diode operating at the wavelength of said medium, and means for combining the output of said injection locking laser diode with the output of one laser medium in a predetermined direction, and means for extracting from said closed optical polygon an output laser beam emanating from one medium in said desired direction.

* * * * *